United States Patent
Russell, II et al.

(10) Patent No.: US 8,842,800 B2
(45) Date of Patent: Sep. 23, 2014

(54) FUEL ROD DESIGNS USING INTERNAL SPACER ELEMENT AND METHODS OF USING THE SAME

(75) Inventors: William Earl Russell, II, Wilmington, NC (US); Christopher J. Monetta, Wilmington, NC (US); David Grey Smith, Leland, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1439 days.

(21) Appl. No.: 11/987,159

(22) Filed: Nov. 28, 2007

(65) Prior Publication Data

US 2009/0135987 A1 May 28, 2009

(51) Int. Cl.
*G21C 3/30* (2006.01)
*G21C 3/18* (2006.01)

(52) U.S. Cl.
CPC ............... *G21C 3/18* (2013.01); *G21Y 2004/30* (2013.01); *G21Y 2004/403* (2013.01); *Y02E 30/40* (2013.01); *G21Y 2002/304* (2013.01); *G21Y 2002/201* (2013.01)
USPC ........... 376/428; 376/409; 376/412; 376/434; 376/435; 376/438

(58) Field of Classification Search
USPC .................. 376/434, 435, 438, 428, 412, 409
See application file for complete search history.

(56) References Cited

U.S. PATENT DOCUMENTS

| 3,220,152 A | 11/1965 | Sturm |
| 3,230,152 A * | 1/1966 | Kerze, Jr. .................. 376/420 |
| 3,940,318 A | 2/1976 | Arino et al. |
| 3,998,691 A | 12/1976 | Shikata et al. |
| 4,196,047 A | 4/1980 | Mitchem et al. |
| 4,284,472 A | 8/1981 | Pomares et al. |
| 4,362,691 A * | 12/1982 | Lang et al. .................... 376/267 |
| 4,462,956 A | 7/1984 | Boiron et al. |
| 4,475,948 A | 10/1984 | Cawley et al. |
| 4,493,813 A | 1/1985 | Loriot et al. |
| 4,532,102 A | 7/1985 | Cawley |
| 4,597,936 A | 7/1986 | Kaae |
| 4,617,985 A | 10/1986 | Triggs et al. |
| 4,636,352 A | 1/1987 | Boyle |

(Continued)

FOREIGN PATENT DOCUMENTS

CN    1051452    5/1991
EP    1 012 852 B1    8/2003

(Continued)

OTHER PUBLICATIONS

Merriam-Webster's' Collegiate Dictionary, Tenth Edition, 1993, p. 736.*

(Continued)

*Primary Examiner* — Jack W Keith
*Assistant Examiner* — Sharon M Davis
(74) *Attorney, Agent, or Firm* — Harness, Dickey & Pierce (57) ABSTRACT

Example embodiments may include a nuclear fuel rod and/or segment design using fuel element spacers. Fuel element spacers may be placed at intervals within fuel rods and/or segments in order to manipulate operating characteristics of the fuel rods and/or segments and/or decrease consequences of fretting of the fuel rod and/or segment. Example methods may include using fuel rods and/or segments having fuel element spacing elements by adjusting intervals of the spacing elements so as to affect the mechanical, neutronic, and/or thermal properties of the fuel rod and/or segment.

12 Claims, 9 Drawing Sheets

(56) References Cited

U.S. PATENT DOCUMENTS

| | | |
|---|---|---|
| 4,663,111 A | 5/1987 | Kim et al. |
| 4,678,924 A | 7/1987 | Loriot et al. |
| 4,729,903 A | 3/1988 | McGovern et al. |
| 4,782,231 A | 11/1988 | Svoboda et al. |
| 4,859,431 A | 8/1989 | Ehrhardt |
| 5,053,186 A | 10/1991 | Vanderheyden et al. |
| 5,145,636 A | 9/1992 | Vanderhevden et al. |
| 5,347,550 A | 9/1994 | Tanabe et al. |
| 5,355,394 A | 10/1994 | Van Geel et al. |
| 5,400,375 A | 3/1995 | Suzuki et al. |
| 5,513,226 A | 4/1996 | Baxter et al. |
| 5,596,611 A | 1/1997 | Ball |
| 5,615,238 A | 3/1997 | Wiencek et al. |
| 5,633,900 A | 5/1997 | Hassal |
| 5,682,409 A | 10/1997 | Caine |
| 5,758,254 A | 5/1998 | Kawamura et al. |
| 5,867,546 A | 2/1999 | Hassal |
| 5,871,708 A | 2/1999 | Park et al. |
| 5,910,971 A | 6/1999 | Ponomarev-Stepnoy et al. |
| 6,056,929 A | 5/2000 | Hassal |
| 6,160,862 A | 12/2000 | Wiencek et al. |
| 6,192,095 B1 | 2/2001 | Sekine et al. |
| 6,233,299 B1 | 5/2001 | Wakabayashi |
| 6,275,557 B2 * | 8/2001 | Nylund et al. ............... 376/433 |
| 6,298,108 B1 * | 10/2001 | Farawila ............... 376/420 |
| 6,456,680 B1 | 9/2002 | Abalin et al. |
| 6,678,344 B2 | 1/2004 | O'Leary et al. |
| 6,751,280 B2 | 6/2004 | Mirzadeh et al. |
| 6,804,319 B1 | 10/2004 | Mirzadeh et al. |
| 6,895,064 B2 | 5/2005 | Ritter |
| 6,896,716 B1 | 5/2005 | Jones, Jr. |
| 7,157,061 B2 | 1/2007 | Meikrantz et al. |
| 7,235,216 B2 | 6/2007 | Kiselev et al. |
| 2002/0034275 A1 | 3/2002 | Abalin et al. |
| 2003/0012325 A1 | 1/2003 | Kernert et al. |
| 2003/0016775 A1 | 1/2003 | Jamriska, Sr. et al. |
| 2003/0103896 A1 | 6/2003 | Smith |
| 2003/0179844 A1 | 9/2003 | Filippone |
| 2004/0091421 A1 | 5/2004 | Aston et al. |
| 2004/0105520 A1 | 6/2004 | Carter |
| 2004/0196942 A1 | 10/2004 | Mirzadeh et al. |
| 2004/0196943 A1 | 10/2004 | Di Caprio |
| 2005/0105666 A1 | 5/2005 | Mirzadeh et al. |
| 2005/0118098 A1 | 6/2005 | Vincent et al. |
| 2006/0062342 A1 | 3/2006 | Gonzalez Lepera et al. |
| 2006/0126774 A1 | 6/2006 | Kim et al. |
| 2007/0133731 A1 | 6/2007 | Fawcett et al. |
| 2007/0133734 A1 * | 6/2007 | Fawcett et al. ............... 376/438 |
| 2007/0297554 A1 | 12/2007 | Lavie et al. |
| 2008/0031811 A1 | 2/2008 | Ryu et al. |
| 2008/0076957 A1 | 3/2008 | Adelman |

FOREIGN PATENT DOCUMENTS

| | | | |
|---|---|---|---|
| EP | 1 667 165 | 6/2006 | |
| JP | 63-252292 A | 10/1988 | |
| JP | 2-73191 | 3/1990 | |
| JP | 2000-512761 A | 9/2000 | |
| JP | 2006162613 * | 6/2006 | ............... 376/438 |
| RU | 48428 | 10/2005 | |
| WO | WO 97/49092 A1 | 12/1997 | |
| WO | WO 00/39807 | 7/2000 | |

OTHER PUBLICATIONS

Office Action for corresponding Chinese Application No. 200810179638.0 dated Mar. 28, 2012.
Japanese Office Action dated Aug. 27, 2013 issued in corresponding Japanese Application No. 2008-292876, with English translation.
Office Action for corresponding Japanese Application No. 2008146972 dated Apr. 26, 2012.
Office Action for corresponding Taiwanese Application No. 097144351 dated Dec. 3, 2013.

* cited by examiner

FUEL ROD DESIGNS USING INTERNAL SPACER ELEMENT AND METHODS OF USING THE SAME

BACKGROUND

1. Field

Example embodiments generally relate to fuel structures used in nuclear power plants and methods for using fuel structures.

2. Description of Related Art

Generally, nuclear power plants include a reactor core having fuel arranged therein to produce power by nuclear fission. The fuel elements may have a variety of configurations and/or characteristics, based on operating conditions of the specific nuclear power plant. For example, size, placement with respect to the core, placement relative to other fuel, enrichment, elemental fuel type, and shape of fuel all affect plant operating parameters. A common design in U.S. nuclear power plants is to arrange fuel in a plurality of cladded fuel rods bound together as a fuel assemblies placed within the reactor core.

Figure 1:
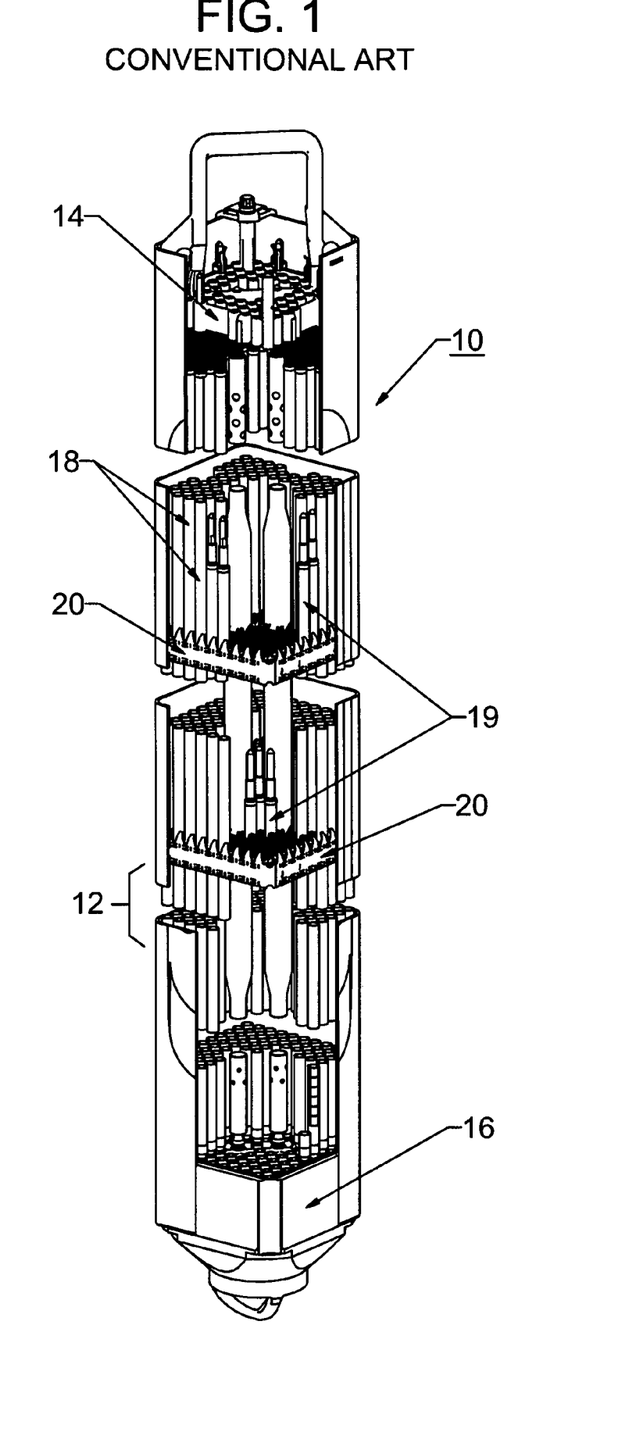
FIG. 1 is an illustration of related art fuel assembly having continuous rods.

As shown in FIG. 1, a conventional fuel bundle 10 of a nuclear reactor, such as a BWR, may include an outer channel 12 surrounding an upper tie plate 14 and a lower tie plate 16. A plurality of full length fuel rods 18 and/or part length fuel rods 19 may be arranged in a matrix within the fuel bundle 10 and pass through a plurality of spacers (also known as spacer grids) 20 vertically spaced one from the other and maintaining the rods 18, 19 in the given matrix thereof.

The fuel rods 18 and 19 are generally continuous from their base to terminal, which, in the case of the full length fuel rod 18, is from the lower tie plate 16 to the upper tie plate 14. Thus the cladding and fuel elements within the rod are also generally continuous through the length of the fuel rods 18 or 19.

Figure 2:
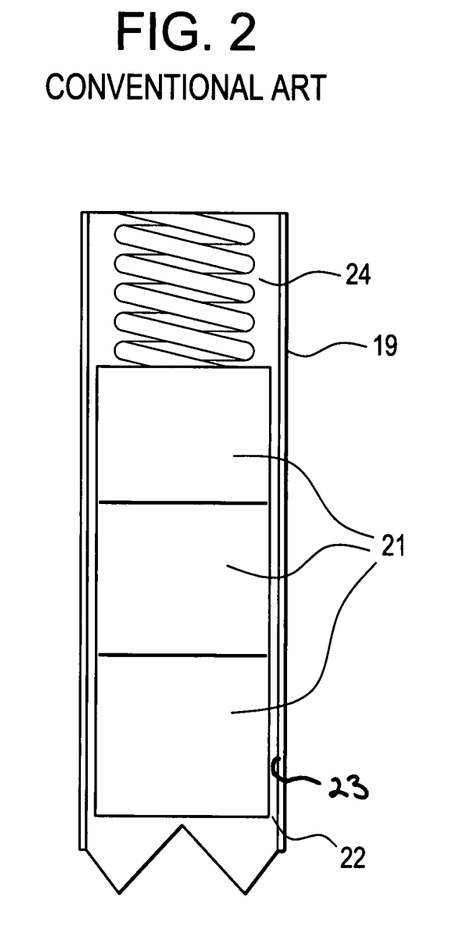
FIG. 2 is a detailed illustration of a related art fuel rod from FIG. 1 showing fuel elements and associated spacing therein.

As shown in FIG. 2, fuel elements 21 may be shaped in pellet-form and placed within the fuel rods 18 or 19. These fuel pellets 21 may be "stacked" within the fuel rod continuously to provide fuel through the length of the fuel rod 18 or 19. The stacking of fuel pellets 21 may permit expansion or other deformation of the fuel pellets 21 during the operation cycle of the reactor core. Further, a gap 22 between the pellets 21 and the inner wall 23 of the fuel rod 18 or 19 accommodates gaseous fission products produced from the fuel pellets 21 during operation of the reactor. The gap 22 may be a vacuum or filled with a low pressure, non-reactive gas such as Helium. Further gaps (not shown) and/or springs 24 at ends of the fuel rod may be present to further allow fission product accumulation and pellet deformation.

SUMMARY

Example embodiments are directed to a fuel rod design using internal fuel element spacers, specifically, to specialized internal fuel element spacers placed at intervals within fuel rods and/or segments in order to manipulate operating characteristics of the rod and/or reduce problems associated with fretting of the fuel rod. Example embodiment fuel element spacers may be placed at varying intervals with rod height and/or clustered at rod ends in order to protect fretting regions at rod ends. Example embodiments may further include using fuel rod segments with internal spacing elements instead of single, continuous fuel rods. Example methods may include using fuel rods and/or segments having fuel element spacing elements by adjusting intervals of the spacing elements so as to affect the mechanical, neutronic, or thermal properties of the fuel rod segment.

BRIEF DESCRIPTIONS OF THE DRAWINGS

Example embodiments will become more apparent by describing, in detail, example embodiments thereof with reference to the attached drawings, wherein like elements are represented by like reference numerals, which are given by way of illustration only and thus do not limit the example embodiments herein.

FIGS. 7A, 7B, 7C, and 7D illustrate various example fuel spacing elements.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 3A:
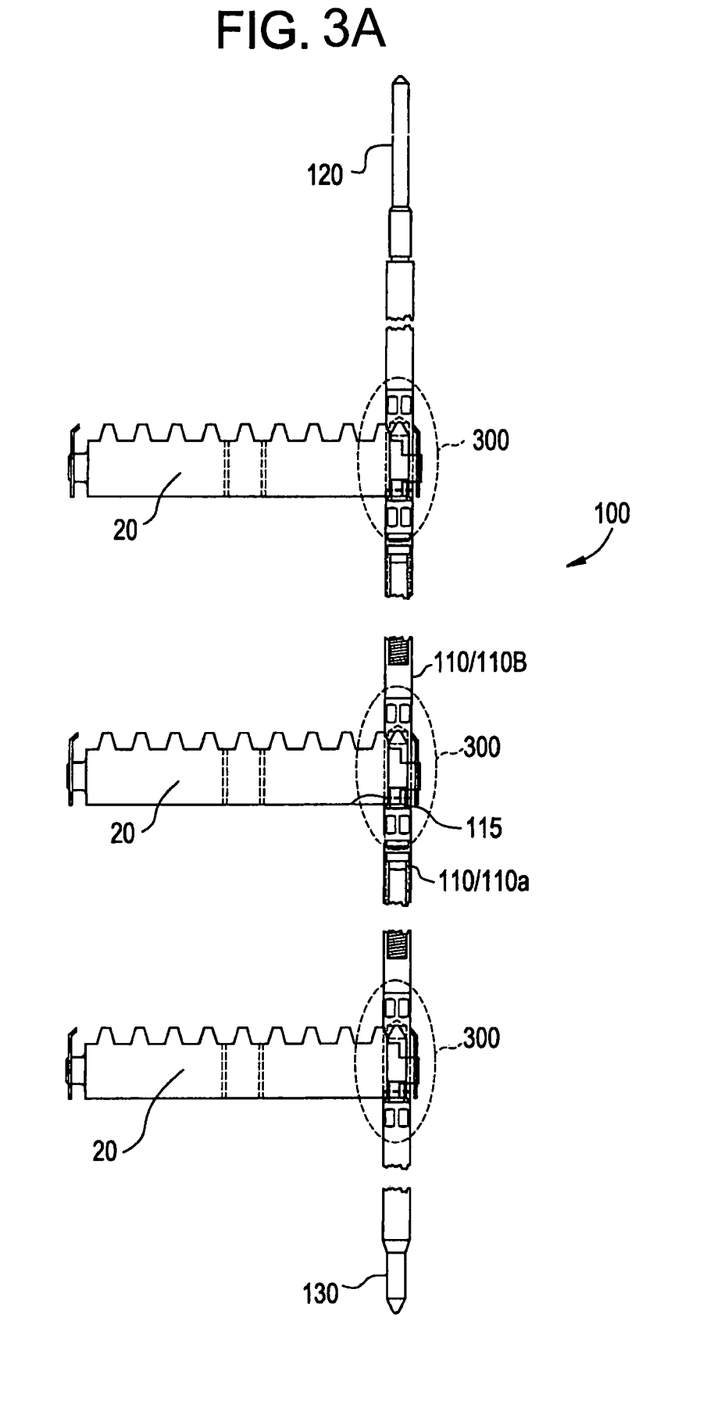
FIG. 3A is an illustration of example embodiment fuel rod segments and spacer.
Figure 3B:
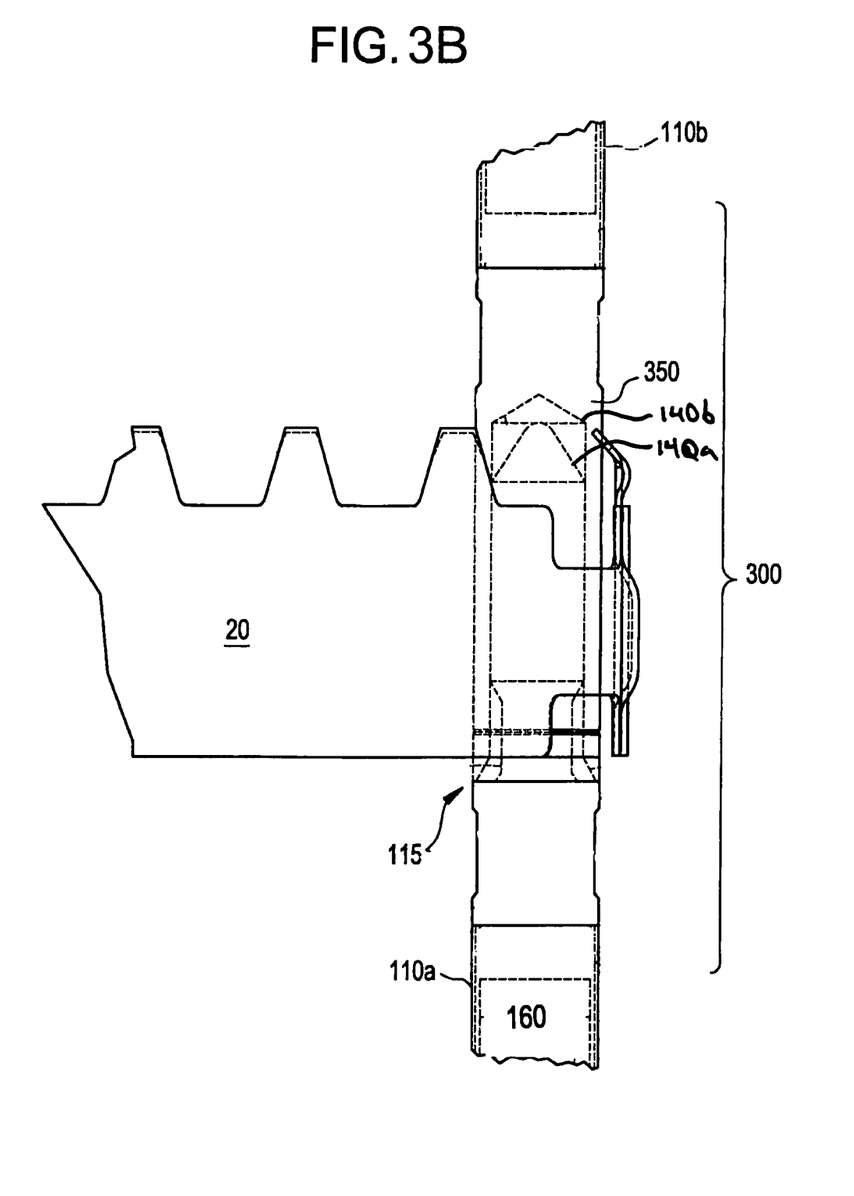
FIG. 3B is a detailed view of the spacer and example embodiment segmented rods of FIG. 3A.

FIGS. 3A and 3B illustrate an example embodiment fuel rod segment. FIG. 3A illustrates a plurality of rod segments 110 between an upper end piece 120 and a lower end piece 130. The upper end piece 120 and lower end piece 130 may include threads or other mating mechanisms to mate with the lower and upper tie plates (see FIG. 1) of the fuel bundle 10 (see FIG. 1), as is known. Adjacent rod segments may be interconnected to each other via another rod segment or adaptor subassembly, shown generally as a subassembly 300 within the dotted line circle of FIG. 3A. In particular, and as described in greater detail below, FIG. 3B illustrates in detail the connections of adjacent rod segments 110a and 110b shown in the dotted line circle.

Only one rod assembly 100 formed of example embodiment rod segments 110 is shown in FIG. 3A, it being understood that one or more of the rod assemblies 100 and rod segments 110 shown in FIG. 3A may be inserted into a fuel bundle. For example, rod assemblies 100 may substitute for one or more of the fuel rods 18 and 19 in the fuel bundle 10 of FIG. 1.

Example embodiment rod segments 110 may be attached between the upper and lower end pieces 120 and/or 130 and to each other so as to form an entire axial length of the rod assembly 100. Example embodiment rod segment 110a, example embodiment rod segment 110b, and one each of the upper and lower end pieces 120 and 130 may be connected directly or by adaptor subassemblies 300 at connections points along the axial length of the rod assembly 100. In the embodiment of FIGS. 3A and 3B, these connection points are axially arranged at least where the rod assembly contacts spacers 20. Although only three spacers 20 and adaptor subassemblies 300 are shown in FIG. 3A, the fuel bundle 10 could include one or more rod assemblies 100, each having at least one example embodiment rod segment 110a and at least one example embodiment rod segment 110b connected to each other or by adaptor subassemblies 300 at any number of spacer 20 locations. Example embodiment rod segments 110a may 110b may be fixed length segments to facilitate the manufacturing process. Alternatively, example embodiment rod segments may have differing lengths in order to accommodate part-length rod designs and/or various spacer positions and sizes.

Example embodiment rod segments may be constructed of a material which is corrosion resistant and compatible with the other reactor components. For example, a zirconium alloy may be used in fabricating example embodiment rod segments. Example embodiment fuel rod segments having been described above, it will be appreciated that any reference to a "rod segment" or "fuel rod segment" invokes the above description, whereas a "fuel rod" or "rod" used alone refers to the continuous rods described in the background section.

As shown in detail in FIG. 3B, a spacer 20 may contact the rod assembly 100 at the adaptor subassembly 300 so as to substantially cover the adaptor subassembly 300. Alternatively, an example embodiment rod segment 110 lacking fuel elements may join other example embodiment rod segments 110 at connection points 115 between rod segments 110. Accordingly, the consequences of fretting at these points 115 due to a spacer 20 contacting a rod segment may be eliminated or reduced. While fretting may still occur, the fretting wear may occur on the adaptor subassembly 300 or unfueled rod segment, instead of on a fueled segment 110a or 110b. Accordingly, this may eliminate or reduce potential release of contents from within an example embodiment rod segment 110 to the reactor coolant.

Figure 4:
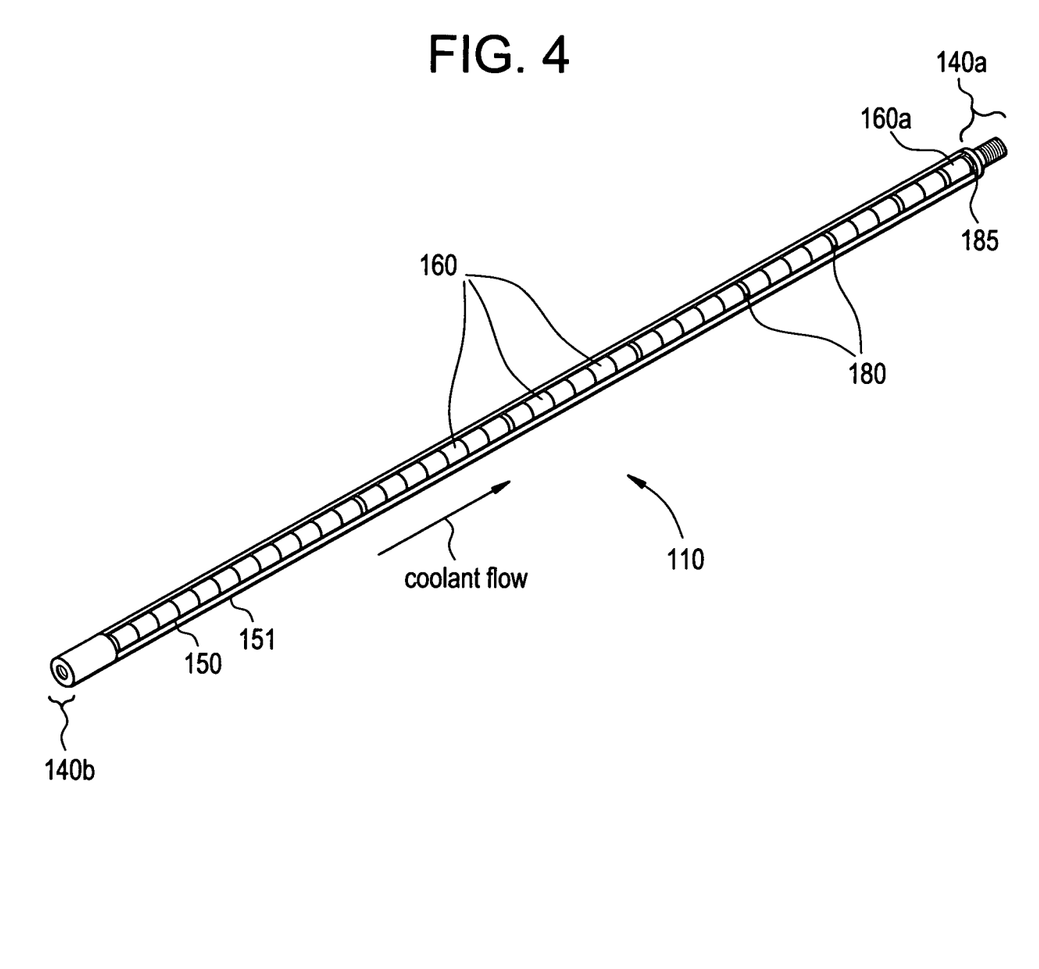
FIG. 4 is a cut-away view of an example embodiment fuel rod segment.

FIG. 4 is a cut-away view of an example embodiment rod segment 110 showing internal structures within the rod segment 110. As shown in FIG. 4, a central housing 150 exists within the rod segment and is enclosed by an exterior cladding 151. First and second mating structures 140a and 140b are disposed at respective first and second ends of the rod segment 110 and seal the central housing 150. The mating structures 140a and 140b may permit the rod segment 110 to be removably mated to other structures including other rod segments as discussed above.

The example rod segment 110 may contain one or more fuel elements 160 within the central housing 150. Each fuel element 160 may contain one or more nuclear fuels, such as uranium and/or plutonium, in an appropriate physical medium such as a ceramic oxide or the like. Fuel elements 160 may be formed into "pellets" as shown in FIG. 4; however, other physical shapes, such as spheres, hexahedral bodies, etc., may be used. The elements 160 may be axially aligned within the housing 150 so as to form a stack along the longitudinal axis of the rod segment 110.

The example rod segment 110 also contains one or more internal spacing elements 180 within the central housing 150, coaxially placed with any fuel elements 160 within the housing 150. The internal spacing elements 180 rigidly constrain the fuel elements 160 to particular axial positions and/or spacing intervals within the example embodiment rod segment 110.

The internal spacing elements 180 may be placed at a variety of intervals within example rod segments 110. Placement of internal spacing elements 180 may affect neutronic and heat generation characteristics of example rod segments as discussed below, allowing greater power generation while maintaining heat generation limits.

For example, as shown in FIG. 4, internal spacing elements may be placed with greater frequency toward the first mating structure 140a than the second mating structure 140b. In this way, the spacing elements 180 may effectively change the fuel concentration, associated neutron flux, and heating characteristics by increasing fuel concentration toward the second mating structure 140b (i.e., toward the second end of the rod segment 100).

As another example, in an operating nuclear core, a coolant may flow along the example rod 110 in FIG. 4 in the direction shown therein. Spacers 20 as shown in FIG. 3B may be placed at or near first and second mating structures 140a and 140b as described above. The spacers 20 may mix the coolant flowing through the spacer, and, as the coolant flows in the direction indicated by the arrow in FIG. 4, the coolant may become less mixed at positions along a boundary layer of the rod segment 110. A coolant may have decreasing convective heat transfer characteristics as it flows in the direction shown in FIG. 4, away from the spacer 20 near the second mating structure 140b. Thus, the greatest risk of insufficient heat transfer and violation of a critical power ratio may occur near the first mating structure 140a, where the coolant is least mixed and hottest, before the coolant reaches a next spacer 20.

Internal spacing elements 180 placed at intervals shown in FIG. 4 may effectively reduce the amount of fuel and heat generated near the first mating structure 140a, thus reducing the amount of necessary heat transfer to the coolant as the coolant becomes less mixed and/or less capable of convective heat transfer. The intervals shown in FIG. 4 may thus prevent or reduce insufficient heat transfer between the rod segment 110 and a coolant, and thereby improve efficiency of a reactor using example embodiment rod segments 110.

Similarly, as shown in FIG. 4, a fuel element 160a positioned toward the end of the example embodiment fuel segment may have a different fuel concentration, such as a higher or lower concentration of uranium, to further enhance and complement the effect on axial heat profile achieved by internal spacing elements 180.

Alternatively, internal spacing elements 180 may be placed at other intervals that affect neutronic and/or heat generation characteristics of example embodiment rod segments 110, and segments having different intervals may be combined to produce an overall more efficient core. For example, a rod segment 110 placed at an axial position within the core with an overly high neutron flux level may contain more internal spacing elements 180 to effectively reduce the fuel content and flux at that particular axial position. Other neutronic characteristics modified by spacer element placement may include, for example, hydrogen-to-uranium ratios and neutron absorption and scattering cross sections of example embodiment fuel rod segments. In this way, internal spacing elements 180 may provide a refined mechanism by which to affect neutron flux within a nuclear core containing example embodiment rod segments 110.

Figure 5:
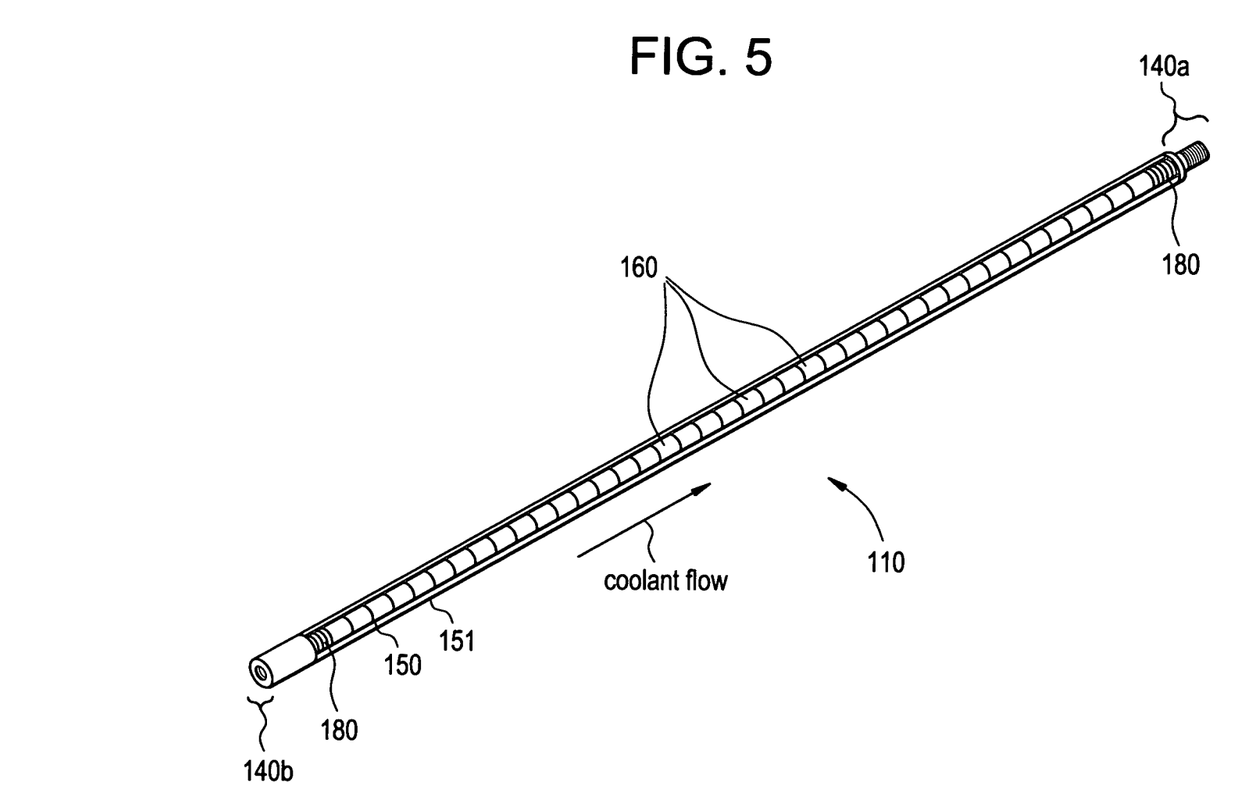
FIG. 5 is a cut-away view of another example embodiment fuel rod segment.

Internal spacing elements 180 may further improve mechanical characteristics of an example embodiment rod segment 110. As discussed above, spacers 20 placed near first and second mating structures 140a and 140b may fret segments 110. As shown in FIG. 5, placing internal spacing elements 180 successively and adjacent to first and/or second mating structures 140a and/or 140b may prevent or reduce release of fuel elements 160 contained in the segment 110 if rod segments 110 containing nuclear fuel are fretted during operation by an overlapping or slipped spacer 20. That is, additional spacing elements 180 may provide a longer length around the spacer 20 where fretting may occur with reduced or no escape of fuel elements 160 or pieces thereof through the fret, even if a spacer 20 slips or otherwise overlaps a rod segment 110 containing fuel. In this way, internal spacing elements 180 may affect and/or improve mechanical characteristics of an example embodiment rod segment 110.

Internal spacing elements 180 may be formed of a variety of materials and physical shapes in order to achieve the above-described functions. Internal spacing elements 180 are generally sized to fit within the housing 150 and are generally shaped to rigidly maintain spacing intervals between fuel elements 160. For example, spheres, cylinders, disks, pucks, annuluses, cubes, hexahedrons, and/or toroids may all be functional shapes of spacing elements 180 that achieve the spacing functions described above. Internal spacing elements 180 are generally rigid in a longitudinal axial direction so as to maintain constant spacing intervals between fuel elements 160. Internal spacing elements may "float" with the fuel elements 160, maintaining relative axial displacement among fuel elements, but allowing the internal spacing elements and fuel elements to move in relation to the housing and fuel rod segment.

As shown in FIG. 4, example embodiment fuel rods may include a spring or resistive element 185 that provides a compressive force on fuel elements 160 and/or spacing elements 180. Such a resistive element 185 may include a coil, tab spring, or the like fabricated from a material that maintains its elasticity and other physical properties in an operating nuclear reactor environment. The compressive force offered by a resistive element 185 may accommodate changes in fuel element 160 shape and orientation within the cavity 150 throughout the operational fuel cycle.

Figure 6:
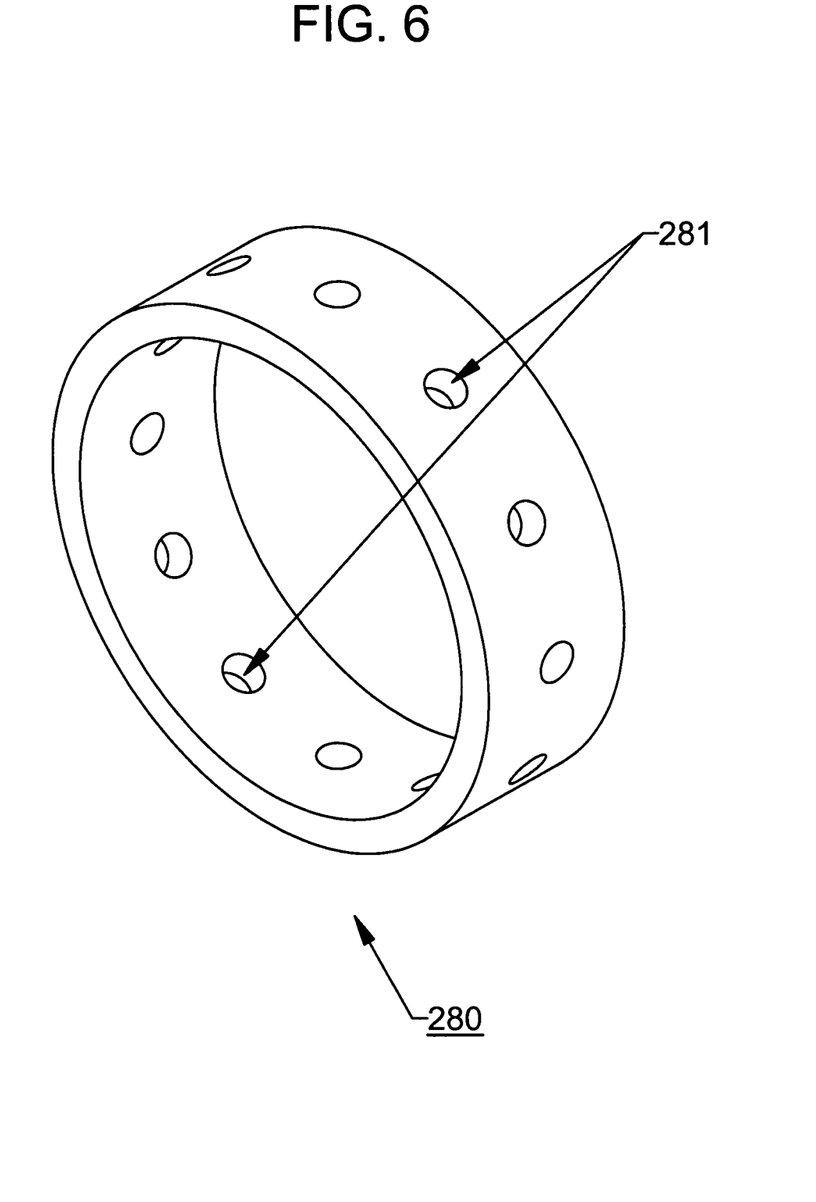
FIG. 6 is an illustration of an example fuel spacing element.

FIG. 6 illustrates an example internal spacing element 280 that has in an annular shape. A internal spacing element 280 in an annular shape may rigidly space fuel elements in an axial direction and allow for fission gas products to fill the center of the annulus. Thus the example internal spacing element 280 shown in FIG. 6 may provide an example embodiment fuel rod segment with additional space to accommodate gaseous, liquid, and/or solid fission products, and the example embodiment fuel rod segment may require less other space to accommodate these products. Additionally, access holes 281 may be present to permit fission product migration, particularly gaseous and liquid fission product migration, into the annulus in the event that fuel pellets block access to the annulus. In this way fission products may migrate through a gap in the housing into the annulus.

Figure 7A:
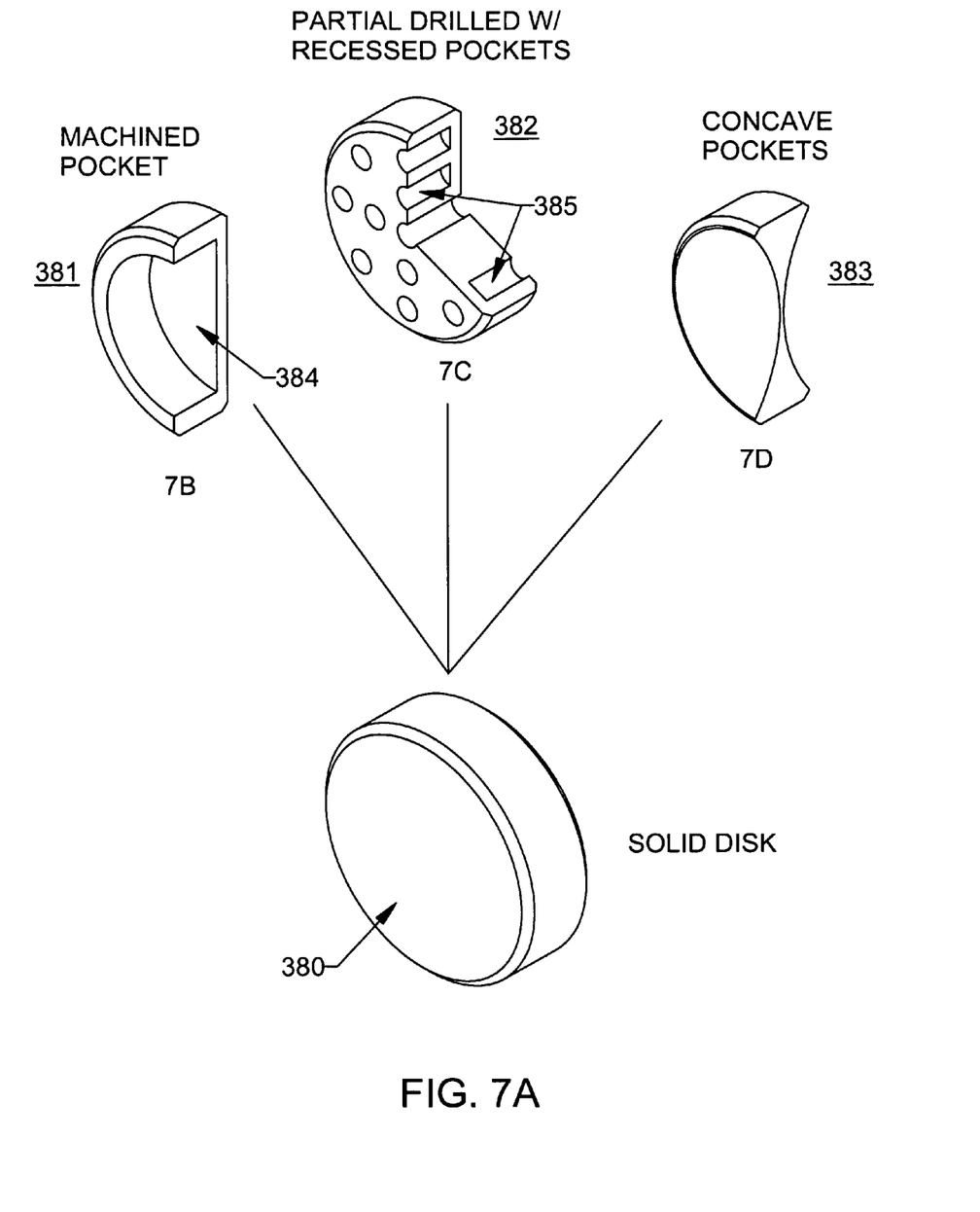

FIG. 7A illustrates an example internal spacing element 380 that has a solid cylindrical shape. An internal spacing element 380 in a solid cylindrical shape may space fuel elements in an axial direction and may further compartmentalize example embodiment rod segments by being solid. As discussed above, internal spacing element 380 may substantially meet an inner diameter 23 (shown in FIG. 2) of a housing 150 so as to aid in compartmentalization. Example spacing element 380 may prevent migration of fission products throughout example embodiment rod segments and may decrease fission product movement in the case of fretting due to decreased fission product migration past the solid internal spacing element 380.

FIGS. 7B-7D illustrate different surface configurations for example embodiment internal spacing elements. As shown in FIG. 7B, example embodiment internal spacing element 381 may have a machined pocket 384 in at least one of its faces to accommodate fission product accumulation therein, without permitting fission products to pass through example embodiment internal spacing element 381. FIG. 7C illustrates an example embodiment internal spacing element 382 having a plurality of partially drilled holes 385 that do not pass the entire axial length of the example embodiment internal spacing element 382. The holes 385 may accommodate fission product buildup without permitting fission products to pass through example element 382. FIG. 7D illustrates another example embodiment internal spacing element 383, which has a recessed/concave surface. The recessed/concave surface may permit fission product accumulation in the recess without allowing the products to pass through the example spacing element 383.

Internal spacing elements 180 may be fabricated from a variety of materials based on how they are to affect example embodiment fuel segments. For example, in the case where spacing elements are designed to decrease effective fuel concentration, spacers may be fabricated from a material having a thermal neutron absorption and/or scattering cross section lower than that of conventional nuclear fuel, for example, less than 5 barns. These example internal spacing elements 180 may be fabricated from zirconium or another rigid material having a low total neutron cross section, such as inconel. Alternatively, spacing elements may serve to absorb neutron flux, in which case internal spacing elements may be formed of a material having a higher thermal neutron absorption cross section, including, for example, boron.

Internal spacing elements 180 may further be made of a material that substantially meets the inner wall 23 of the housing 150. The material may be expandable or resistive in order to provide rigid axial spacing and confinement, so as to compartmentalize the housing 150 and prevent or reduce fission product migration. Such a material may be used in spacer elements that increase a fret length without fuel element release from example embodiment rod segments. Internal spacing elements 180 may also be fabricated from heat insulative or conductive materials in order to further affect heat generation properties of example embodiment rod segments.

Figure 8:
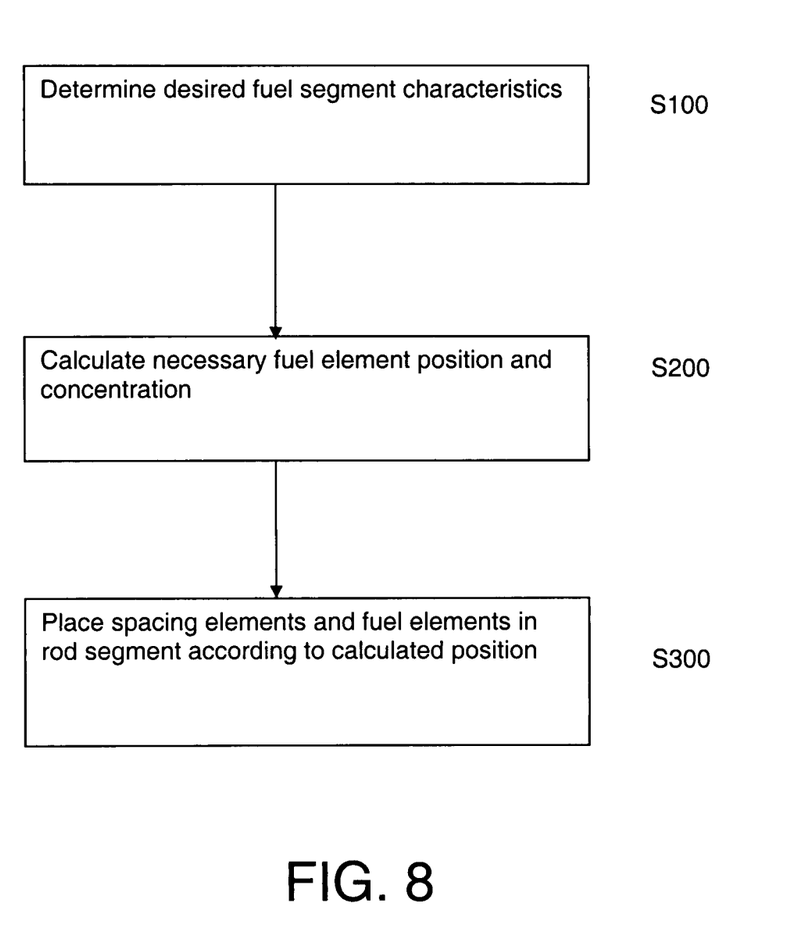
FIG. 8 is a flow chart showing steps in an example method of using fuel rod segments.

FIG. 8 illustrates an example method of using spacing elements in fuel rod segments. As shown in Step S100, an engineer, computer routine, and/or other user determines desired neutronic, mechanical, and thermodynamic properties of a particular rod segment based on that segment's position in the core. For example, the engineer may desire the segment to produce a greater bottom peak axial flux to improve voiding and plutonium generation toward the top of the core. In S200, the engineer, computer routine, or other user calculates a desired fuel concentration and placement within the rod segment according to known methods in the nuclear arts, taking into effect the properties and conditions of the operating nuclear core. In Step S300, the spacing elements and fuel elements are placed within a fuel rod segment to achieve a spacing and relative placement that meets the calculated fuel concentration and placement. Once the example method is completed, the fuel rod segment may be placed in an operating nuclear fuel core in the given position and produce the desired properties input into the example method.

Example embodiments and methods thus being described, it will be appreciated by one skilled in the art that example embodiments and example methods may be varied through routine experimentation and without further inventive activity. For example, while the disclosure has addressed internal spacing elements useable with a rod segment, internal spacing elements may be used in any rod, such as the single, continuous rods 18 and 19 of FIG. 1 and achieve the same functions in continuous rods as described in fuel rod segments. Variations are not to be regarded as departure from the spirit and scope of the exemplary embodiments, and all such modifications as would be obvious to one skilled in the art are intended to be included within the scope of the following claims.

What is claimed is:

1. A fuel rod comprising:
 a plurality of fuel rod segments, at least one fuel rod segment including,
  a housing within the fuel rod segment;
  a plurality of nuclear fuel elements in the housing; and
  at least one internal spacer element, the at least one internal spacer element being,
   axially arranged with the plurality of nuclear fuel elements in the fuel rod segment,
   positioned in the housing adjacent to a position where a mid-bundle spacer contacts the fuel rod,
   having an axial thickness such that none of the nuclear fuel elements are adjacent to the position where the mid-bundle spacer contacts the fuel rod, and
   having a continuous cross-section of a width equal to a width of the housing so as to compartmentalize the housing.

2. The fuel rod segment of claim 1, wherein the internal spacer element occupies a position within the housing such that the rod segment possesses a desired thermal, mechanical, or neutronic property during operation of an operating nuclear core containing the fuel rod.

3. The fuel rod segment of claim 1, wherein the internal spacing element is annular such that the internal spacing element accommodates fission product accumulation within the annulus.

4. The fuel rod of claim 1, wherein the internal spacing element is solid and cylindrical.

5. The fuel rod segment of claim 1, wherein the fuel rod segment includes a plurality of internal spacing elements positioned within the housing with an increased frequency and a lesser interval at a first longitudinal position of the housing than a second longitudinal position of the housing.

6. The fuel rod segment of claim 5, wherein the second longitudinal position is upstream in a coolant flow in an operating nuclear core containing the fuel rod from the first longitudinal position.

7. The fuel rod segment of claim 1, wherein the fuel rod segment includes a plurality of internal spacing elements and at least a portion of the plurality of internal spacing elements are positioned consecutively at and adjacent to the position where the mid-bundle spacer contacts the fuel rod.

8. The fuel rod segment of claim 1, wherein the internal spacing element is fabricated of a material such that physical and neutronic properties of the at least one internal spacing element are not affected during operation of a nuclear core containing the fuel rod segment.

9. The fuel rod of claim 1, further comprising:
 a resistive element positioned at an end of the housing and axially with the nuclear fuel elements and internal spacing element so as to provide a compressive force on the nuclear fuel elements and internal spacing element.

10. The fuel rod of claim 1, wherein the nuclear fuel elements do not have the same enrichment.

11. A method of using a fuel rod, the method comprising:
 determining at least one of a desired neutronic, mechanical, and thermodynamic property of the fuel rod;
 calculating a fuel element placement within the fuel rod, the placement achieving the at least one desire neutronic, mechanical, and thermodynamic property in an operating nuclear core containing the fuel rod; and
 placing at least one internal spacing element and at least one fuel element into the rod according to the calculated placement.

12. The method of claim 11, wherein the placing step places the at least one internal spacing element and the at least one fuel element into at least one fuel rod segment forming the fuel rod.

* * * * *